March 6, 1973   B. T. CLEEVELY   3,719,446
MOLD ASSEMBLY FOR PRODUCING THREADED ARTICLES WITH
UNSCREWING MEANS INTEGRAL WITH THE ASSEMBLY
Filed Dec. 22, 1970   4 Sheets-Sheet 1
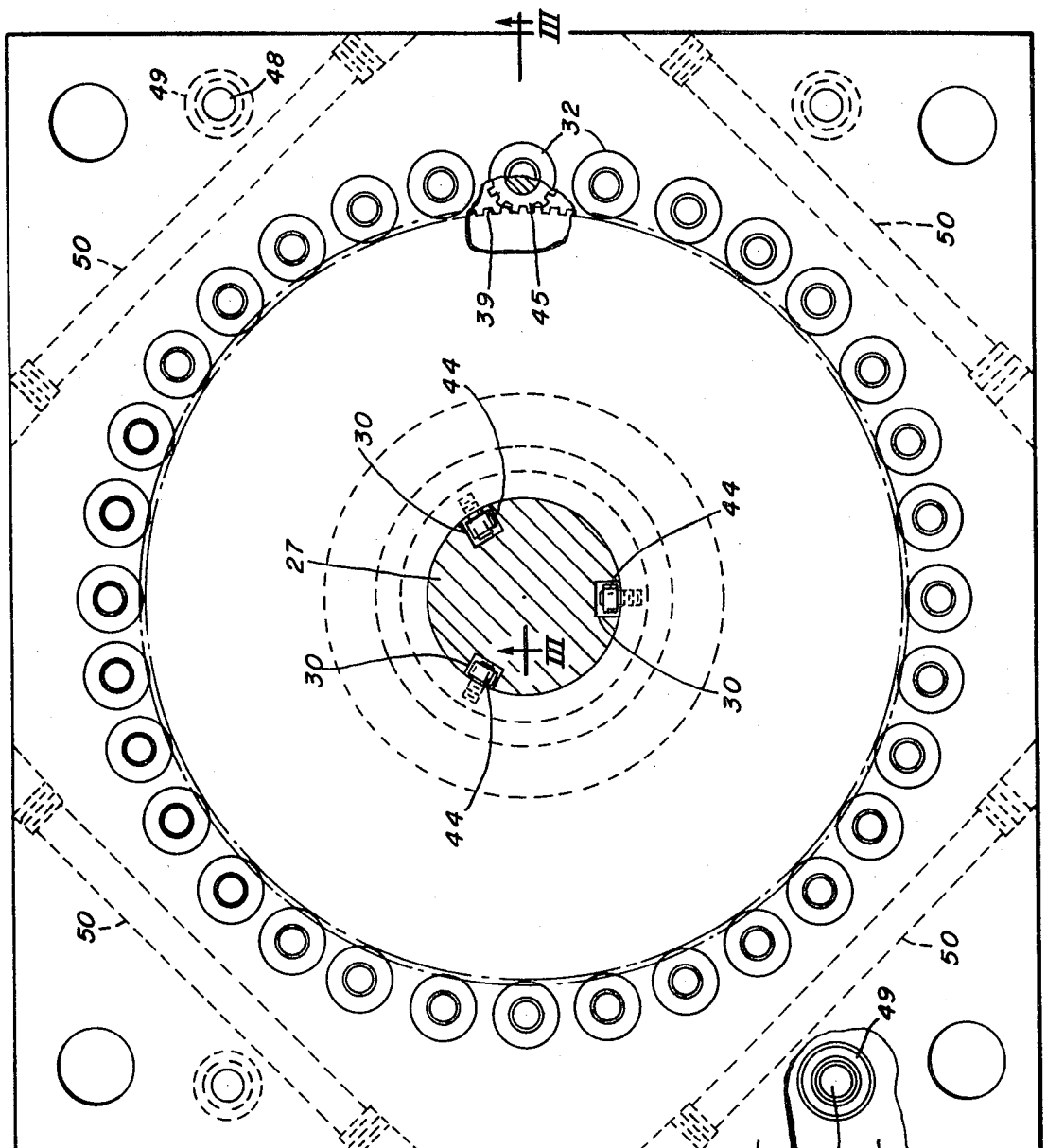
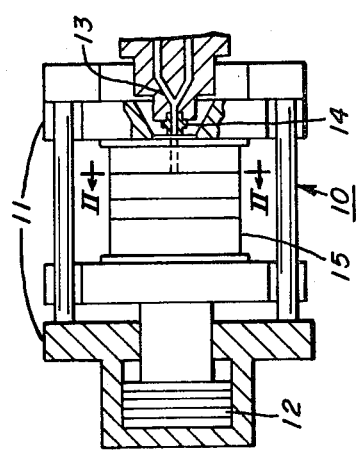
INVENTOR.
BRUCE T. CLEEVELY
Attorneys

INVENTOR.
BRUCE T. CLEEVELY

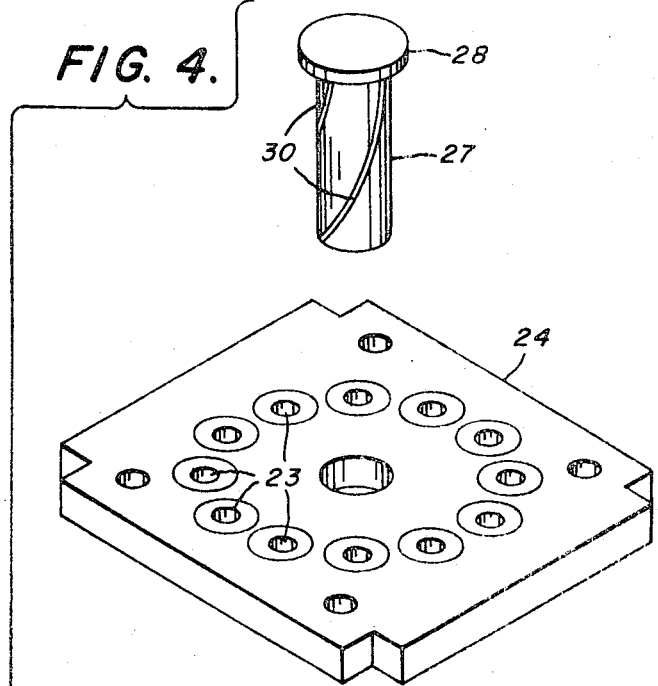
FIG. 4.
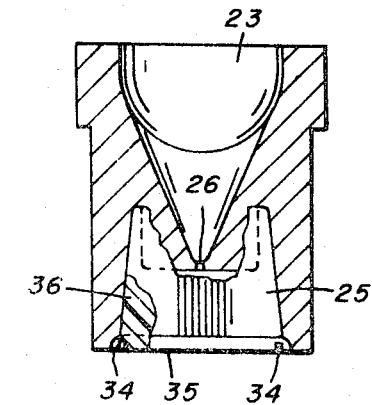
FIG. 5.
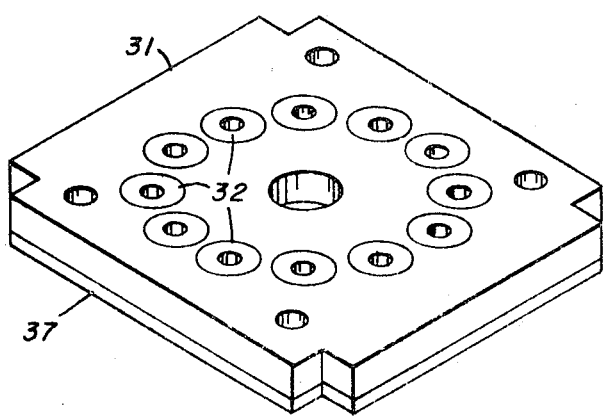
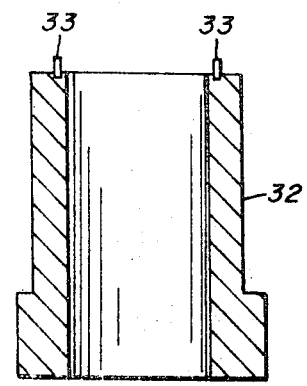
FIG. 6.
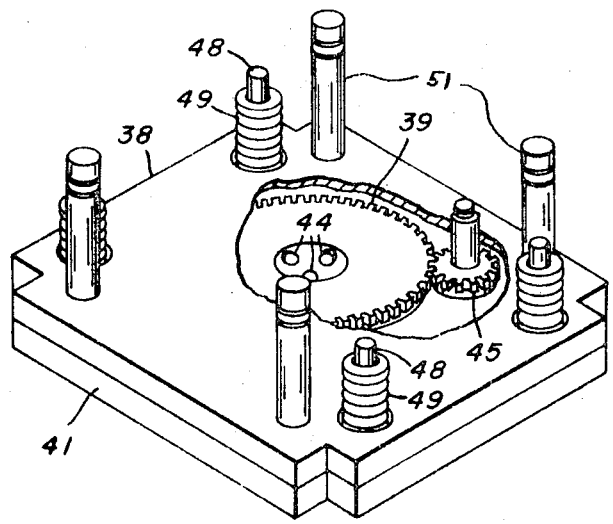
INVENTOR.
BRUCE T. CLEEVELY
Attorneys March 6, 1973   B. T. CLEEVELY   3,719,446
MOLD ASSEMBLY FOR PRODUCING THREADED ARTICLES WITH
UNSCREWING MEANS INTEGRAL WITH THE ASSEMBLY
Filed Dec. 22, 1970   4 Sheets-Sheet 4

INVENTOR.
BRUCE T. CLEEVELY
By Parmelee, Utyler & Welsh

Attorneys

United States Patent Office 3,719,446
Patented Mar. 6, 1973

3,719,446
MOLD ASSEMBLY FOR PRODUCING THREADED ARTICLES WITH UNSCREWING MEANS INTEGRAL WITH THE ASSEMBLY
Bruce T. Cleevely, Allegheny, Pa., assignor to Wheeling Stamping Company, Wheeling, Ohio
Filed Dec. 22, 1970, Ser. No. 100,621
Int. Cl. B29f 1/14
U.S. Cl. 425—249
14 Claims

ABSTRACT OF THE DISCLOSURE

A mold assembly is detailed for use with a molding apparatus, for rapidly producing threaded molded articles. The mold assembly has unscrewing means integral with the assembly to effect unscrewing of the threaded article from the mold simultaneous with opening of the mold.

BACKGROUND OF THE INVENTION

The use of molding apparatus for producing plastic and metallic products has continued to increase during recent times. The injection molding of thermoplastic polymers is an important commercial fabrication process. Countless everyday items ranging from containers for personal hygiene products such as toothpaste tube heads and caps, automotive accessories, closures, industrial products and toys are produced by this process. All injection molding operations are carried out while establishing an equilibrium between temperature, pressure and time. The thermoplastic material is heated to the molten state and injected under pressure into a cooled mold cavity formed in a mold assembly which is clamped to withstand the injection pressure. The molded article is then rapidly cooled and ejected from the mold assembly to permit high speed continuous production. A more complete description of the injection molding process can be had from ABS Plastics, by C. H. Besdekis, pps. 76–84, Reinhold Publishing Corp., 1964.

Many of the articles produced by injection molding processes are necessarily threaded articles. This fact complicates the rapid ejection of the formed article from the mold assembly because it is necessary to unscrew the threaded article from the threaded mold part against which it was formed. Various techniques have been practiced in the prior art to effect such an unscrewing. The injection molding apparatus itself has been modified to allow coupling of the opening stroke to rotate a mold core member by a complicated external gear assembly. A recent patent, U.S. 3,084,387 issued Apr. 9, 1963 teaches that it is impractical to couple the mold opening to the unscrewing process, and teaches moving the threaded article to an unscrewing station where an auxiliary electric motor is used for this purpose. The coupling of mold opening to the unscrewing process is shown in U.S. Pat. 3,091,810 issued June 4, 1963. The device described therein involved the cooperative action of a specially designed mold assembly for a special injection mold apparatus, with the mold assembly being rotatably indexed from an injection station to succeeding cooling stations, to the unscrewing station. The mold assembly was opened at the unscrewing station by magnetic means.

The key factors which good mold assembly design take into consideration are high speed operation and reliability or simplicity of operation.

SUMMARY OF THE INVENTION

A mold assembly is provided for use with a molding apparatus. The mold assembly has integral means for effecting rapid unscrewing of a plurality of threaded, molded articles simultaneously with the opening of the mold assembly. The mold assembly can be used with a conventional injection molding apparatus which comprises means for opening and closing the mold assembly and transporting or plastic injection means for delivering molten plastic material to the mold cavities in the mold assembly.

The mold assembly comprises stationary and movable mold portions which are mateable to define a plurality of threaded mold cavities. The mold assembly includes a helically grooved central post extending through at least a portion of both the stationary and movable mold portion. A rotatable central gear is included having a central aperture therethrough through which the central post extends, with inwardly extending groove following means directed into the aperture and fitting the groove provided in the central post. Thus, upon relative axial movement between the central post and the central gear as the mold assembly is opened the central gear is rotated as the groove following means travel about the helical groove in the central post. A plurality of rotatable gears are orbitally disposed about the central gear and are engaged therewith to be driven by the rotating central gear, with the rotary movement of each orbital gear coupled to a respective threaded mold cavity portion to effect unscrewing of the threaded molded article. Means are provided for restraining the threaded molded article from rotation, and for axially urging the unscrewing article away from the threaded mold assembly portion. The article is then removable from the mold assembly by simply letting it fall out of the assembly, or by forcing it out by a jet of air.

The apparatus and method of the invention are particularly described with respect to an injection molding application. The invention can be practiced with other types of molding apparatus. In describing molded threaded articles it is to be understood that this encompasses not only the internally threaded caps described in the preferred embodiment, but also externally threaded pieces, and even spiral or helical members such as springs.

BRIEF DESCRIPTION OF THE DRAWINGS

FIG. 1 is a schematic view in elevation in which a simplified representation of the mold assembly of the present invention is shown in combination with an injection molding apparatus.

FIG. 2 is a view of the gear plate which is simplified in detail taken along direction II—II of FIG. 1.

FIG. 4 is an exploded perspective view showing some of the key elements of the mold assembly.

FIG. 5 is an enlarged view in section of one mold cavity portion of the mold assembly shown in FIG. 3.

FIG. 6 is an enlarged view in section of a stripper bushing which mates with the stationary mold cavity.

DESCRIPTION OF THE PREFERRED EMBODIMENTS

Figure 3:
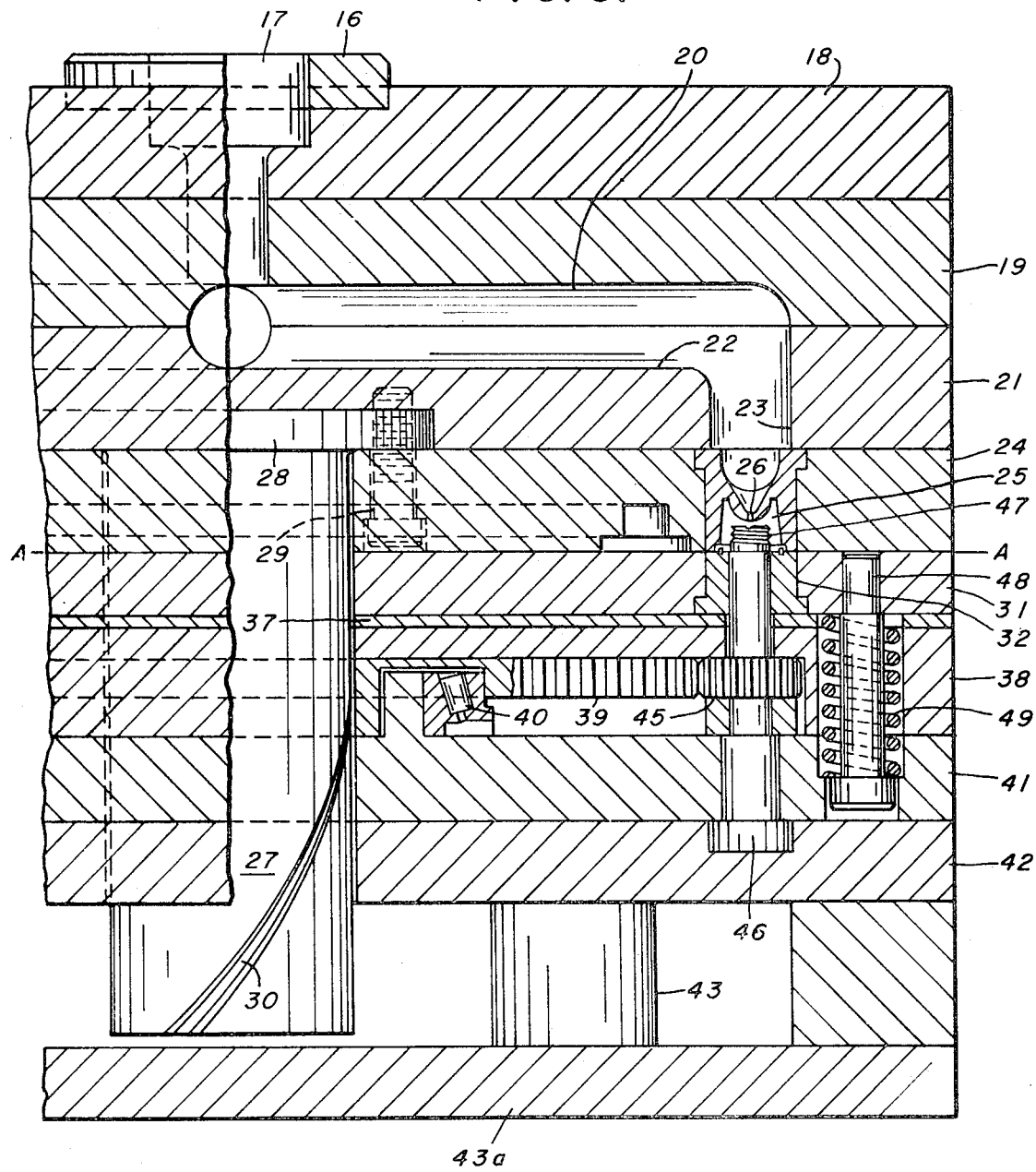
FIG. 3 is a view in partial section of the mold assembly of the present invention.

The invention can best be understood by reference to the exemplary embodiment shown in the drawings. In FIG. 1, a simplified longitudinal view of an injection molding apparatus including the mold assembly of the present invention is seen. The injection molding apparatus 10 comprises a clamping framework 11 which has opening and closing means 12 associated therewith which is typically a hydraulic or mechanical system but may comprise other systems conventional in injection molding apparatus. A molten plastic injector 13 is disposed at one end of the apparatus, and includes a nozzle 14 which leads to the mold assembly 15.

The mold assembly 15 is more clearly shown in detail in partial cross-section in FIG. 3 as an assembly of separable plates. This view is taken when the mold assembly is in a closed or clamped position. A locating ring 16 and sprue bushing 17 which adapt the assembly to the nozzle 14 are centrally disposed respectively at the side of the mold assembly adapted to the nozzle 14, and through the top clamp plate 18, which is fastened to the clamping framework 11 of the injection molding apparatus. The sprue bushing 17 is extended through the first runner plate 19 and into a plurality of radiating grooves 20 cut in the bottom surface of the first runner plate 19. The adjacent second runner plate 21 has a like number of matching radiating grooves 22 cut in the top surface thereof. The matched grooves acting as runners for the molten thermoplastic material are continued in runner channels 23 extending axially through the second runner plate. Mold cavity plate 24 is contiguous with the second runner plate 21, with the runner channels 23 leading into a plurality of mold cavities 25 formed in the cavity plate 24 and disposed orbitally about the central axis of the cavity plate 24. A gating means 26 controls the flow of molten thermoplastic material into each mold cavity 25.

A plurality of aligned apertures not shown, are provided through the cavity plate 24, the runner plates 19, 21 and the top clamp plate 18, with the apertures being threaded to receive fastening bolts, also not shown. The fastening bolts connect the aforementioned plates together as the stationary portion of the mold assembly. Also included as a part of the stationary portion is a helically grooved generally cylindrical central post 27. A mounting flange 28 is provided at one end of the central post to fit in a recess provided in the second runner plate 21, a large central aperture is provided through the mold cavity plate 24 through which the central post extends. The flange 28 is bolted to the mold cavity plate 24 so that the central post is part of the stationary mold portion. A plurality of bolts 29, only one of which is shown are directed through apertures provided in the mold cavity plate, the flange 28 and the second runner plate 21. At least one helical groove, and in this embodiment three symmetrically disposed grooves 30 are helically cut in post 27, and extend about the post along the length, the function of these helical grooves will be explained later. The line A—A indicates the line along which the mold assembly is opened when the forming of the molded article is complete.

The remaining mold assembly parts constitute the axially movable mold portions. A stripper plate 31 is disposed to abut the mold cavity plate 24 when the mold assembly is clamped closed. Stripper plate 31 includes a plurality of stripper bushings 32 aligned with the mold cavities 25, which have a plurality of extending fingers 33 best seen in FIG. 6 which are directed from the stripper plate into each mold cavity to form gripping slots 34 on the inner rim 35 of the molded article 36. These extending fingers 33 remain in place in the gripping slots of the molded article when the mold opens and act to restrain the molded article from rotary movement.

A work hardened spacer plate 37 may be disposed between gear plate 38 and the stripper plate 31 to act as an impact resistant wear plate in view of the slamming of the mold assembly upon closing. The other plates can be work hardened and the spacer plate 37 dispensed with.

A gear plate 38 abuts the spacer plate 37 and has a rotatable central gear 39 mounted thereon on a thrust bearing 40 with a roller bearing, not shown, disposed on top of the gear 39 between the gear 39 and plate 38. First and second support plates 41, 42 and support rails 43 and a back plate 43a complete the movable mold portion. A central post receiving aperture extends through the stripper plate, the gear plate and the first and second support plates. The back plate 43a is fastened to the clamping framework 11 whereby the movable mold portion can be opened and closed.

Groove following means 44 which are here roller bearings are symmetrically directed inward from the rotatable gear to seat within the spiral grooves provided on the stationary central post. Thus, when the mold is opened by axially moving the movable mold portion away from the stationary mold portion carrying the gear plate and rotatable primary gear thereon. The groove following roller bearings roll following the helical grooves about the central post thereby causing the primary gear to rotate.

The rotatable primary gear 39 has a plurality of orbitally disposed rotatable gears 45 engaged therewith. The orbital gears 45 are disposed in a space provided in the gear plate, with the central axis of respective orbital gears being aligned with the axis of a corresponding mold cavity.

The first support plate 41, the gear plate 38, each orbital gear 45, spacer plate 37, and the stripper plate 31 are provided with aligned apertures therethrough, through which mold core means 46 are disposed. The mold core means 46 comprise cylindrical member having a threaded portion 47 at the end which fits a respective mold cavity 25. The threaded portion 47 of the mold core comprises the bottom wall of the mold cavity 25 which is filled with the molten thermoplastic material in molding the threading article. Each mold core means is connected to the orbital gear through which it passes by a set screw, not shown. Thus, when each orbital gear is driven by the primary gear upon mold opening, each mold core means is rotated thereby, and moved axially therewith, away from the stationary mold portions, to effect unscrewing of the threaded molded article.

Another plurality of aligned apertures are provided through the stripper plate 31, spacer plate 37, gear plate 38 and partially through the support plate 41. Shoulder pins 48 are directed through these apertures with a spring member 49 disposed about each shoulder pin 48 as best seen in FIGS. 3 and 4. One end of the spring member abuts the stripper plate. When the mold assembly is closed, the spring is compressed between the stripper plate and the support plate. When the mold assembly is opened, the entire movable mold portion is moving away from the cavity plate with unscrewing of the molded article from the threaded mold core taking place simultaneously. The spring member is kept compressed by virtue of the molded articles threadedly engaging the mold cores. When the unscrewing process is completed the spring member expands forcing the stripper plate away from the rest of the movable mold portions, and thereby forcing the molded article away from the end of the mold core allowing the molded article to fall from the mold assembly for collection. A jet of air may be provided to assist the molded article in clearing the mold assembly. The spring compression on spring member 49 is such that the stripper plate 31 is only moved a distance sufficient to relax the spring to clear the unscrewed molded article off the mold core 46.

A plurality of symmetrical positioned guide posts 51, such as the four seen in FIG. 4 at the corners of the gear plate 38, extend through aligned apertures in the mold assembly plates to facilitate assembly, and the opening and closing operations. Fastening bolts which are not shown in the drawings extended through and connect the individual plates of the movable portion together so that in operation, except for the stripper plate, the other plates of the movable portion are connected together and move as a unit.

The back plate is connectable to the molding apparatus clamping system to allow opening and closing of the mold assembly.

Water channels 50 shown for example in the gear plate, and heating elements, which are not shown, are provided through the specific plates where desired to control the flow and cooling of the thermoplastic material as is well known in mold assembly design.

Figure 7:
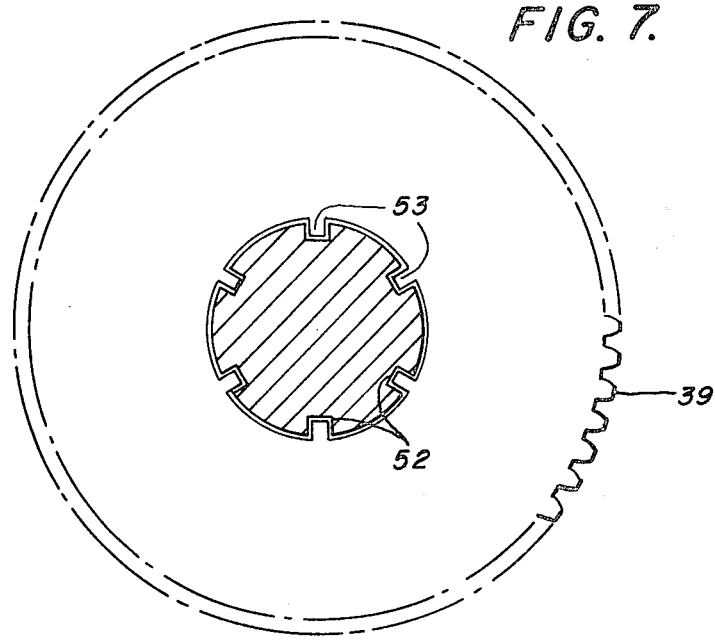
FIG. 7 is an enlarged view of another embodiment of the helically grooved central post and groove following means.

An alternative embodiment of the helically grooved central post 27 and groove following means 44 are seen in FIG. 7. In this embodiment six symmetrically disposed helical grooves 52 are cut in the post 27. The grooves 52 have a generally square cross section. The groove following means are six helical splines 53 which are directed inward from the rotatable gear, and seating within respective grooves 52. The splines 53 are of a cross section which substantially matches the groove cross section to improve the wear resistance.

Figure 8:
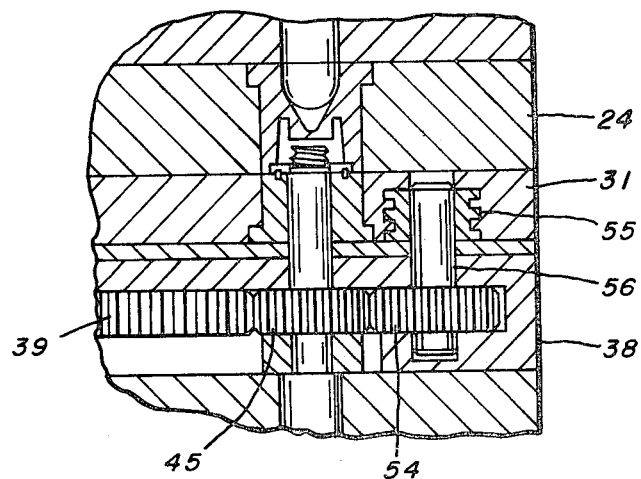
FIG. 8 is an enlarged view of another embodiment of the means for axially urging the unscrewing article away from the threaded mold cavity.

An alternative embodiment of the means for axially urging the unscrewing article away from the threaded mold cavity is seen in FIG. 8. A set of secondary orbitally disposed gears 54 are engaged with respective orbital gears 45. The gears 54 will then be rotated as the central gear 39 rotates on mold opening. The gears 54 are used to drive screw jacks 55 which are linked via shaft 56 to the gears 54 and are used to axially urge the stripper plate 31, into which the jacks 55 are fitted, away from the gear plate 38 thus urging the unscrewing molded article off the mold cover 46.

The mold assembly of the present invention with its single centrally located drive gear and the circular arrangement of cavities has numerous practical advantages over the conventional rectangular grid arrangement. The circular cavity arrangement makes possible the use of a balanced runner system, i.e. the molten plastic conveyor runners are symmetrical and of the same length, which simplfies keeping the thermoplastic material molten.

The present mold assembly allows for extremely fast molding, and unscrewing of the articles produced. The requirement for costly auxiliary power equipment for unscrewing the articles has been eliminated by the present design.

In the embodiment shown in the drawings the orbital gears used for unscrewing are disposed in the same plane. The present mold assembly design allows for the orbital gears to be tiered to occupy less space and optimize the number of cavities which can circularly be disposed in the mold assembly.

The present mold assembly has the advantage of being utilizable with any standard molding apparatus since the unscrewing mechanism is integral with the mold assembly.

While the mold assembly plates are shown in traditional square form, it is apparent that with the radial mold cavities the plates can be readily made circular.

The invention has been described for use with internally threaded molded articles but can readily be used with externally threaded molded articles which must also be necessarily unscrewed from the mold cavity. The mold cavity thread portions may be interchanged and the unscrewing may be achieved by rotating the molded piece rather than any portion forming the mold cavity. Such variations will be apparent to one skilled in the art.

I claim:

1. A mold assembly for use with a material molding apparatus, wherein the molding apparatus comprises means for opening and closing the mold assembly which is coupled thereto, means for transporting material into a mold cavity defined by a stationary mold portion and a movable mold portion at least one of which is a threaded mold portion, the mold assembly adapted to produce threaded molded articles which are unscrewed from the mold assembly as the mold assembly is opened, wherein the mold assembly comprises:

(a) a stationary mold portion which is mountable on the molding apparatus and adaptive to the material transport means, and including a plurality of mold cavity portions;

(b) a movable mold portion which is mountable on the molding apparatus and adapted to be axially moved thereby to an open and closed mold assembly position, said movable mold portion mating with the stationary mold portion when the mold assembly is closed to define therewith the mold cavities;

(c) a helically grooved central post included as part of the stationary mold portion and extending from the stationary mold portion into the movable mold portion and adapted to fit therein;

(d) a rotatable central gear included in the movable mold portion having a central aperture therethrough with inwardly extending groove following means directed into the aperture and adapted to fit the groove provided in the helically grooved central post which extends through the central aperture, and whereby when the rotatable central gear is axially moved, the gear rotates as the groove following means travel about the central post;

(e) a plurality of rotatable gears included in the movable mold portion and orbitally disposed about the central gear and engaged therewith to be driven by the rotatable central gear;

(f) a plurality of article engaging means extending from the movable mold portion toward the stationary mold portion proximate each mold cavity to engage the molded article and permit relative rotation between the molded article and the threaded mold portion of the mold cavity; and (g) a plurality of mold core means included as part of the movable mold portion, said mold core means extending from the movable mold portion toward the stationary mold with an individual mold core means associated with an aligned mold cavity to define a threaded mold cavity, each mold core means being coupled to an orbital gear whereby, when the axially movable mold portion moves away from the stationary mold portions upon opening of the mold assembly, the mold core means is rotated and axially moved to effect unscrewing of the threaded article.

2. The mold assembly specified in claim 1 including means for producing relative axial movement between the unscrewing article and the threaded mold cavity to thereby separate same.

3. The mold assembly as specified in claim 2, wherein said means axially urging the unscrewing article away from the threaded mold portion comprise lost motion means which upon mold opening react to axially urge the unscrewing article away from the threaded mold portion.

4. The mold assembly specified in claim 3, wherein said lost motion means comprise a compressible spring disposed between a stripper plate portion which is included in the movable mold portion of the mold assembly which abuts the threaded molded article, and a support plate, whereby when the mold assembly is closed said spring is compressed, and when the mold assembly is opened said spring urges the stripper plate axially away from the rest of the movable mold portion, with the stripper plate as a result of abutting the molded article axially urging the molded article away from the movable mold portion simultaneous with the unscrewing of the article therefrom.

5. The mold assembly specified in claim 2, wherein said groove means and groove following means comprise a plurality of generally square cross-sectional portions, with the groove following means fitting the groove means.

6. The mold assembly specified in claim 2, wherein said means for producing relative axial movement between the unscrewing article and the threaded mold cavity comprise a plurality of secondary orbital gears engaged with respective orbital gears driven by the central gear, which secondary orbital gears are coupled to screw jack means engaged with means contiguous with the molded article to thereby axially urge the molded article away from the threaded mold cavity.

7. The mold assembly specified in claim 2, wherein said mold assembly includes a plurality of mold cavities and a plurality of threaded mold core means which fit respective mold cavities, each mold core means is coupled to an orbitally disposed rotatable gear whereby unscrewing of the threaded molded article is effected.

8. The mold assembly specified in claim 2, wherein means are provided for restraining the molded threaded article from rotation, which means comprise a plurality of engaging arms which extend into the mold cavity to be engaged with the molded article.

9. The mold assembly as specified in claim 2, wherein a plurality of symmetrically spaced grooves are helically wound about the central post, and an equal number of symmetrically spaced groove following means extend from the gear plate.

10. The mold assembly specified in claim 2, wherein said material molding apparatus is an injection molding apparatus and the material to be molded is a thermoplastic material.

11. A mold assembly for use with a material molding apparatus, wherein the molding apparatus comprises means for opening and closing the mold assembly which is coupled thereto, and means for transporting material into the mold assembly, the mold assembly adapted to produce threaded molded articles which are simultaneously unscrewed from the mold assembly as the mold assembly is opened, wherein the mold assembly comprises:

(a) a stationary mold portion which is mountable on the molding apparatus and adaptive to the material transport means, and including a plurality of mold cavity portions;

(b) a movable mold portion which is mountable on the molding apparatus and adapted to be axially moved thereby to an open and closed mold assembly position, said moveable mold portion mating with the stationary mold portion when the mold assembly is closed to define therewith the mold cavities;

(c) a helically grooved central post included as part of the stationary mold portion and extending from the stationary mold portion into the movable mold portion and adapted to fit therein;

(d) a rotatable central gear included in the movable mold portion having a central aperture therethrough with inwardly extending groove following means directed into the aperture and adapted to fit the groove provided in the helically grooved central post which extends through the central aperture, and whereby when the rotatable central gear is axially moved, the gear rotates as the groove following means travel about the central post;

(e) a plurality of rotatable gears included in the movable mold portion and orbitally disposed about the central gear and engaged therewith to be driven by the rotatable central gear;

(f) a plurality of article engaging means extending from the movable mold portion toward the stationary mold portion proximate each mold cavity to engage the molded article to restrain the molded article from rotary movement;

(g) a plurality of mold core means included as part of the movable mold portion, said mold core means extending from the movable mold portion toward the stationary mold with an individual mold core means associated with and having a threaded end portion which extends into an aligned mold cavity, each mold core means is coupled to an orbital gear whereby when the axially movable mold portion moves away from the stationary mold portion upon opening of the mold assembly, the mold core means is simultaneously rotated and axially moved to effect unscrewing of the threaded article therefrom.

12. The mold assembly specified in claim 11, wherein lost motion means are included for axially urging the unscrewing article away from the threaded mold portion.

13. The mold assembly specified in claim 12, wherein said lost motion means comprise a compressible spring disposed in the movable mold portion, which spring is compressed when the mold is closed, and upon mold opening the spring axially urges the unscrewing molded article away from the movable mold portion.

14. The mold assembly specified in claim 11, wherein said material molding apparatus is an injection molding apparatus and the material to be molded is a thermoplastic material.

References Cited

UNITED STATES PATENTS

| | | | |
|---|---|---|---|
| 3,388,431 | 6/1968 | Aoki | 18—2 R S |
| 3,091,810 | 6/1963 | Turner | 18—2 R S |
| 2,546,882 | 3/1951 | Bauer et al. | 74—57 X |
| 2,558,027 | 6/1951 | Wilson | 18—2 R S X |
| 2,984,862 | 5/1961 | Chambotte | 18—2 R S |
| 3,048,054 | 8/1962 | Heim | 74—57 |
| 2,404,631 | 7/1946 | Gronemeyer | 425—438 |

FOREIGN PATENTS

| | | | |
|---|---|---|---|
| 987,683 | 3/1965 | Great Britain | 425—249 |

J. SPENCER OVERHOLSER, Primary Examiner

D. S. SAFRAN, Assistant Examiner

U.S. Cl. X.R.

425—438

UNITED STATES PATENT OFFICE
CERTIFICATE OF CORRECTION

Patent No. 3,719,446                     Dated March 6, 1973

Inventor(s) Bruce T. Cleevely

It is certified that error appears in the above-identified patent and that said Letters Patent are hereby corrected as shown below:

In Column 1, line 6, delete "Ohio" and insert

--West Virginia--.

Signed and sealed this 1st day of January 1974.

(SEAL)
Attest:

EDWARD M. FLETCHER, JR.
Attesting Officer

RENE D. TEGTMEYER
Acting Commissioner of Patents